Sept. 6, 1960 G. LONG ET AL 2,951,581
VIBRATORY CONVEYORS
Original Filed Jan. 5, 1953 2 Sheets-Sheet 1

INVENTORS
GEORGE LONG
TAKUZO TSUCHIYA

BY William C. Babcock ATTORNEY

Sept. 6, 1960 G. LONG ET AL 2,951,581
VIBRATORY CONVEYORS
Original Filed Jan. 5, 1953 2 Sheets-Sheet 2

INVENTORS
GEORGE LONG
TAKUZO TSUCHIYA
BY William C. Babcock ATTORNEY

United States Patent Office 2,951,581
Patented Sept. 6, 1960

2,951,581

VIBRATORY CONVEYORS

George Long and Takuzo Tsuchiya, Minneapolis, Minn., assignors to General Mills, Inc., a corporation of Delaware Continuation of application Ser. No. 329,556, Jan. 5, 1953. This application June 9, 1959, Ser. No. 819,085

8 Claims. (Cl. 198—220)

The present invention relates to vibratory conveyors and more particularly to vibratory conveyors in which the transmission of undesired forces to any stationary support or building is effectively minimized. This disclosure is a continuation of our co-pending application U.S. Serial No. 329,556, filed January 5, 1953, now abandoned.

Vibratory conveyors are well known in which a conveying member is connected to a building or other stationary support by means of inclined springs. Cyclical or vibratory forces of various types have then been applied to the conveying member to cause it to vibrate back and forth along an inclined arcuate path generally perpendicular to the springs and thus convey material across the member. In some cases, the desired forces have been applied by a rotating unbalanced weight on the conveying member, while in other cases, the forces have been applied by means of a source of power mounted on the stationary support or building and connected to the conveyor either by a rigid crank or eccentric arrangement or by some magnetic force transmission device.

In these prior cases, the application of the desired force impulses to the conveying member has resulted in the transmission of equal and opposite forces to the stationary support or building. In many conveying applications, the magnitude of these forces has been so great that damage to the supporting structure or building would result unless the strength and mass of the supporting structure were increased substantially. Thus for such applications, the ordinary type of vibratory conveyor has been either too costly or impractical to justify its use, and other means of handling materials have had to be sought.

Various attempts have been made to avoid the transmission of such vibrations to the supporting structure. For example, some prior conveyors utilize a counter-balancing mass which is attached to the conveying member in such a way that the counter-balancing mass supposedly balances the vibrations of the conveying member. This increases the proportion of non-useful non-working weight of the structures which must be paid for by the purchaser. To be economical, the proportion of non-useful material in the structure should be at a minimum.

In other cases, self-contained force applying members such as rotating eccentric weights have been mounted directly on the work performing member. Here, however, the vibrations of the working member cause uneven and excessive wear on the shafts and bearings of the eccentric weight device.

Another attempt to avoid the transmission of undesired vibrating forces or motions has involved the provision of an additional resilient or spring support between a base member which carries the inclined springs of the conveying unit and the foundation or building on which such springs would otherwise be mounted. These intermediate cushioning springs have, however, been designated as "soft" or coil springs, and have been intended to provide a floating or resilient support with no specific rigidity. In some cases, the mass of the base member is made very large to minimize such forces and motions.

In one arrangement, involving coil springs for floating support of the intermediate base, it has been further suggested that the necessary conveying forces can be applied by means of a single rotating unbalanced weight mounted on the intermediate base member rather than on the conveying member. The theory of this suggestion has been that motion of the intermediate base could be reduced to zero at certain frequencies. As pointed out in detail below, however, we have found that the use of such a rotating weight on the intermediate base, in combination with "soft" or coil springs for support of the intermediate base, not only fails to keep the intermediate base completely stationary, but may involve both a vertical and a rocking action of the intermediate base. This rocking action was found to produce undesired movements of the conveying member which were not the same at all points along the length of the conveying member and which could seriously interfere with or completely prevent the desired lateral movement of material on the conveyor.

With the above problems and difficulties of the prior art in view, one object of the present invention is the provision of an improved vibratory conveyor in which the transmission of undesired force impulses to a stationary support or building is kept as small as possible without adverse effect on the desired conveying action.

A further object is the provision of a vibratory conveyor in which a conveying member is connected to an intermediate base member by inclined spring beams, and in which the desired conveying forces are obtained by application of appropriate cyclical or vibratory forces to the intermediate base member alone.

Still another object is such a vibratory conveyor in which the intermediate base member is in turn supported by spring beams from a suitable stationary support, in such a way as to insure effective operation of the conveying member.

A still further object is a vibratory conveyor of the above type in which reciprocating forces are applied to the intermediate base member in a direction which minimizes force transmission to the support.

Another object is the provision of a vibratory conveyor in which a first set of spring beams provides the sole supporting connection between a conveying member and a suitable intermediate base, while a second set of spring beams provides the sole connection between the intermediate base and a stationary support.

Another object is the provision of a vibratory conveyor of this type with preferred relative locations and orientations of the two sets of spring beams.

Other objects and advantages of the invention will be apparent from the following description in which certain preferred embodiments of the invention are disclosed.

In the drawings which accompany this application and in which like reference characters indicate like parts, Figure 1 is a perspective view of one form of vibratory conveyor according to the present invention.

Figure 1:
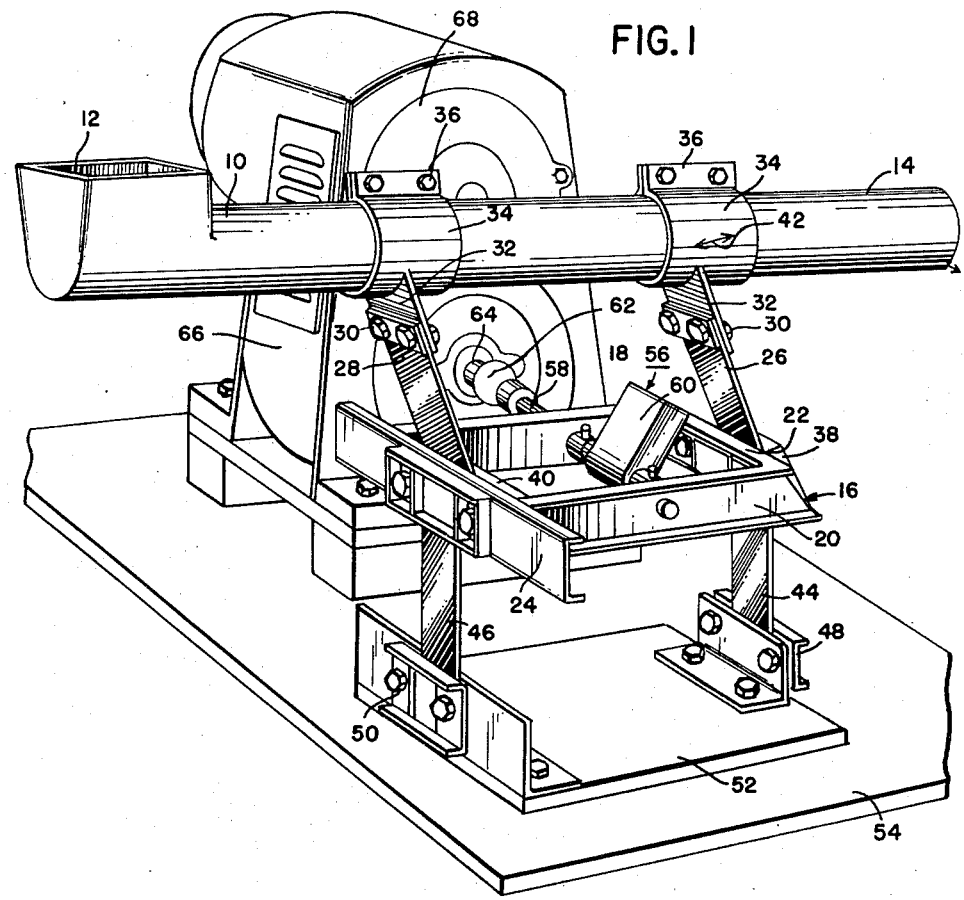
Figure 2:
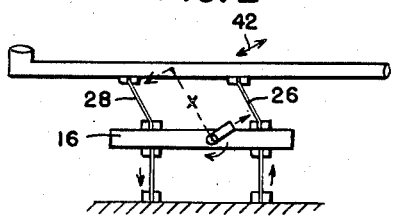
Fig. 2 is a schematic diagram of the device of Fig. 1 in side elevation.

As illustrated specifically in Figs. 1 and 2, the present invention includes a conveying member 10 adapted to convey material from an inlet end at 12 to an outlet end at 14. This conveying member 10 is generally horizontal, although it may obviously be inclined somewhat up-hill or down hill depending on the nature of the material to be conveyed and other requirements and characteristics of a particular installation.

For purposes of illustration, a single longitudinally extending conveyor is shown, which has a straight horizontal direction or path of feed, although certain of the principles of the present invention can be applied satisfactorily to a conveying member or combination of conveying members which follow other paths, such as circular or helical paths.

An intermediate base member, indicated generally at 16, extends generally parallel to the conveying member 10 and is vertically displaced with respect to such conveying member. In this embodiment, the intermediate base 16 is located below the conveying member, although in certain cases as described below it may, for convenience, be located above the conveying member.

The intermediate base member 16 includes longitudinally extending side frame members 18 and 20 and front and rear cross members 22 and 24. These frame members are connected to each other in such a way as to provide a substantially rigid intermediate base unit.

To connect the conveying member 10 and base member 16, a first set of spring beams is provided. In the simple case illustrated, the set includes two spring beams 26 and 28 which are illustrated in the form of flat or leaf springs. The upper ends of these spring beams are rigidly clamped to plate-like extensions 32 on tubular conveying member supports 34 at points spaced longitudinally along the direction of feed on the conveying member. These supports are clamped to the conveyor tube at 36 and serve both to connect the spring beams to the conveying tube 10 and also to cooperate with the spring beams in providing the sole support for the conveying member.

The lower ends of spring beams 26 and 28 are clamped to the intermediate base member 16 at points 38 and 40, respectively, which are also spaced longitudinally along the direction of feed. While both ends of the spring beams are shown as rigidly connected in this figure, it is only necessary that one end of each spring be rigidly secured, while pivotal connections could be used at the remaining ends. In such a case, however, four times the number of springs would be needed for the same resilience, if the spring length remains the same. Thus this first set of spring beams, as pointed out above, provides the sole supporting or weight bearing connection between the conveying member and the base member. Because the spring beams 26 and 28 are inclined slightly from the vertical, and because they are resiliently movable transversely of their length, the spring beam connection provides for relative movement of the conveying member along a slightly inclined path which extends longitudinally of the conveying member and substantially perpendicularly to the planes of the flat spring beams 26 and 28. The actual path of relative movement is more in the nature of an arc, but for small displacements or vibrations along this path, the path may be considered almost as a straight line. The actual path of movement is illustrated by the arrow 42 of Fig. 2.

According to an important feature of the present invention, the intermediate base 16 is supported by a second set of spring beams, two of which are illustrated at 44 and 46 in Fig. 1. The lower ends of these spring beams 44 and 46 are rigidly clamped at 48 and 50, respectively, to a suitable support, such as the rigid plate 52. This plate 52 may in turn be rigidly connected to a larger base member 54 which may constitute the floor or frame of the building, or even a separate and essentially portable supporting platform which can be moved from place to place with the conveyor unit.

The upper ends of spring beams 44 and 46 are rigidly clamped to the intermediate base member 16 and thus the second set of spring beams constitutes the sole supporting connection for this intermediate base, and in turn for the conveying member 10 which is carried by the base. Here again a rigid connection at one end of each spring and a pivotal connection at the other can be used.

It is important according to the present invention that the springs of the second set are substantially non-extensible and non-compressible in a lengthwise direction, i.e., lengthwise of the springs. In this respect, the spring connection between the intermediate base 16 and the stationary support 52, 54 differs substantially from any of the soft coil springs or other floating supports which have been suggested in the prior art.

In general the spring constant $k_2$ for the lower springs should be small to reduce the horizontal forces and to displace the first critical frequency of the system toward the lower end of the frequency range. This reduces the chances of undesired vibration as the machine is shut down and the frequency decreases. In case of large product damping or other damping, a smaller resilience $k_2$ will reduce the force transmission to the foundation. At the same time, however, this resilience $k_2$ of the lower springs must be great enough to support the system as a whole. Within these general principles, the spring constant $k_2$ should be less than the spring constant $k_1$ for the first set of springs, and preferably less than one-fourth of the spring constant $k_1$, while, in general, the masses $m_1$ and $m_2$ are of the same order of magnitude.

To obtain the desired relative movement of conveying member 10 along the path indicated by arrows 42, suitable force impulses are applied to the intermediate base member 16 by a force-applying means indicated generally at 56. This force-applying means is of a type which is essentially self-contained so that the necessary and desired forces are applied only to intermediate base 16 without the transmission of opposite reactive forces through the force-applying means to other parts of the assembly or the foundation on which the assembly is located. In Fig. 1, the means for applying cyclical forces to the intermediate base member 16 is illustrated as a substantially horizontal shaft 58 which extends transversely of the direction of feed of the conveying member 10. It is rotatably supported in the side frame members 18 and 20 of the intermediate base. An eccentric or unbalanced weight 60 is supported on shaft 58 and the shaft is rotated by means of a flexible coupling 62 which in turn is driven by the output shaft 64 of a suitable gearbox or transmission 66. For greater flexibility of practical adjustment or experiment, the transmission 66 may be provided with means (not shown) for variation in the speed of output shaft 64. This shaft is suitably geared to a driving motor 68, and either the motor speed may be varied or the connections between the motor and the output shaft 64 may be adjusted in known manner.

According to the invention, the frequency of the force impulses applied to the intermediate base 16, which in turn will depend on the rate of rotation of shaft 58, is adjusted approximately in the range of the natural frequency of the system which includes the conveying member 10 and the first set of spring beams 26, 28. This natural frequency is defined by the formula $$P = \sqrt{\frac{k_1}{m_1}}$$

where $k_1$ is the spring constant of the upper spring means, and $m_1$ is the effective mass of the conveying member on such springs.

By operation at exactly this frequency, it is theoretically possible (by ignoring frictional or product damping and other factors) to reduce the relative back and forth horizonal movement of the intermediate base member 16 to zero. In other words, the horizontal components of force applied by the eccentric weight 60 (or to be more exact, those components perpendicular to the upper spring beams 26, 28 and parallel to the path of relative movement 42) will be balanced or neutralized in any given instant by equal and opposite forces resulting from the relative deflection of the conveying member 10 and first set of spring beams along said inclined path 42. In this way, forces applied to the intermediate base member 16 result in the desired conveying vibrations of the conveying member 10 without substantial horizontal movement of the intermediate base 16. To the extent that this intermediate base 16 remains stationary, no longitudinal horizontal force impulses will be transmitted to the foundation by the lower set of spring beams 44 and 46, since such springs will remain undeflected.

In actual practice, a system of the type shown in Figs. 1 and 2 involves not only the primary forces, such as those applied by the unbalanced rotating weight 60, but involves secondary forces which may be considered as of a frictional or damping nature. These additional force effects may, in a given case, result in some vibration or reciprocation of the intermediate base 16 and may require operation of the rotating unbalanced weight 60 at a frequency slightly different from the above so-called natural frequency of the upper portion of the system. The direction and extent of this variation in the force frequency can be readily determined in a given case either by consideration of the theoretical analysis given below or by simple test in actual operation.

We have stated that $$P = \sqrt{\frac{k_1}{m_1}}$$

is the undamped natural frequency of the $m_1 k_1$ system. If there were no damping whatsoever, the amplitude of vibration of the intermediate frame would be zero when the forced frequency was made equal to this undamped natural frequency.

In practice, such an ideal situation is never quite met, since damping will always be present to a greater or lesser extent. Because of this damping, which may be due to product load, air resistance or other factors, the vibration of the intermediate frame cannot be reduced to zero in all cases.

Yet if the damping is relatively small compared to the critical damping of the system (i.e., if the so-called dampng constant "C" is not greater than $0.25 C_c$, where $C_c =$ critical damping $= 2\sqrt{k_1 m_1}$), and depending to some extent on the actual ratios of $m_1$ to $m_2$ and $k_1$ to $k_2$, there will generally be a particular value or range of values of the forced frequency, in the immediate vicinity of the undamped natural frequency, at which the vibrations of the intermediate base will have a definite minimum. We have observed that this particular value of the forced frequency is generally different from, and in fact somewhat less than the undamped natural frequency.

On the other hand, if the damping is relatively great compared to the critical damping, the situation may be quite different and there may be no such well defined minimum. It may even be difficult in such a case to achieve good conveying action of the working member. The damping we speak of here is the total damping in the system. This may be considered to include all types of damping as well as the mass effect of the product being conveyed.

Thus if large values of damping are anticipated, much can be done to improve the operation and minimize the vibrations of the intermediate base, the horizontal forces transmitted to the foundation, and the wear and tear on the force applying mechanism, by a careful selection of design parameters. In other words, the adverse effect of damping can be reduced by making the product of $k$ times $m$ as large as possible, consistent with other design conditions, and thus keeping the critical damping high as compared to actual damping.

In operation, the vibratory conveyor is first set to operate without load, at the undamped natural frequency. The forced frequency is then adjusted in the neighborhood of this natural frequency with the conveyor under normal load. The final working frequency is then chosen on the basis of the minimum motion of the intermediate base which is consistent with good conveying action of the working member.

It is important, in any case, that the spring beams 44, 46 of the lower set have a substantial vertical or longitudinal rigidity, so that they prevent relative vertical movement of the intermediate base 16 and also resist any rocking motion of the intermediate base which might otherwise tend to result due to a couple which is set up between the cyclical force of the unbalanced weight 60 and the inertial reaction of the conveyor. This couple is shown in Fig. 2 with the forces acting at a distance $x$ apart, and is discussed further below in connection with Fig. 9. To resist such rocking movement the spring beams 44 and 46 are substantially non-extensible and non-compressible along their length, and the spring beams are further oriented in such a way that they extend from the intermediate base member 16 in a direction having a major vertical component.

Another requirement of the supporting spring system 44, 46 is that it provides the required degree of freedom of movement of the intermediate base 16 in a direction perpendicular to the upper set of spring beams 26 and 28, i.e., parallel to the path of vibrations 42. Ideally, this degree of freedom could be supplied by having the spring beams 44 and 46 essentially parallel to the upper spring beams 26 and 28 as in certain of the modifications described below.

If the angle between the two sets of spring beams increases from zero degrees or 180 degrees (the parallel condition), it is apparent that the intermediate base 16 becomes less and less likely to remain stationary during operation and more and more likely to transmit to the foundation some of the forces perpendicular to the upper springs. Or to put the matter another way, the particular arrangement described above tends to balance and minimize forces perpendicular to the upper set of spring beams 26, 28 because both the upper conveyor member 10 and the intermediate base 16 have relative freedom of movement in this same direction, i.e., parallel to the path 42.

Therefore it is important that the lower set of spring beams 44 and 46 extend from the intermediate base 16 in a direction which has a major component parallel to the upper set of spring beams 26 and 28. By the term "major component," in these cases, we mean that the longitudinal direction of the spring beams 44 and 46 should not be more than 45 degrees from either the vertical, or from a line parallel to the upper inclined springs 26 and 28.

Another way to state this limitation in the orientation of the lower spring beams 44 and 46 is to consider that orientation of the lower springs parallel to the upper ones in effect gives the ideal freedom of movement to the intermediate base, while orientation of these lower spring beams in an exactly vertical direction offers advantages in the vertical support of the intermediate base and its associated conveying member. Thus the preferred range of orientation for the lower spring beams is the range which is limited on the one hand by substantially vertical planes normal to the direction of feed of the conveying member 10, and on the other hand by inclined planes parallel to the inclined springs 26 and 28 of the upper set.

As pointed out in the introductory portions of this specification, there have been some suggestions in the prior art of the possibility of operation of a vibratory member in such a way as to eliminate or minimize transmission of forces to a supporting structure. These prior suggestions have apparently been based on either practical or theoretical analysis of systems with only one assumed degree of freedom. In such systems, as illustrated in Fig. 8, for example, it is theoretically possible to use the principle of the dynamic vibration absorber in such a way that the vibration absorber becomes the work-performing member, and the member whose vibrations are absorbed becomes the intermediate base which supports the work-performing member.

Figure 8:
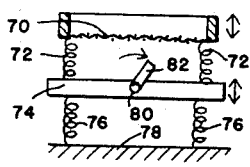

Thus in Fig. 8, the vertically movable screen 70 is supported by horizontally and vertically resilient springs 72 on an intermediate base member 74. This intermediate base member, in turn, is supported by vertically resilient spring members 76 from a suitable support or foundation 78. A shaft 80, rotatably mounted on the intermediate base 74, carries an unbalanced weight 82 and rotates as indicated by the arrow in Fig. 8 to provide the desired cyclical forces.

It has been suggested that such a system can be utilized to provide vertical reciprocation of the screen member 70 without substantial movement of the intermediate base 74, so that, in theory, the latter transmits no force impulses to the foundation 78 via springs 76. (Actually, as pointed out below, the horizontal forces of the unbalanced weight should not be ignored.)

Figure 9:
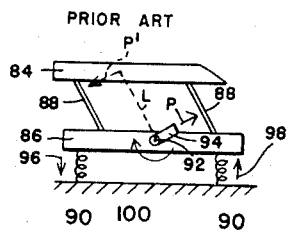
Figs. 8 and 9 are schematic views of prior art constructions, which are included in order to facilitate understanding of the novel and inventive features claimed herein.

Based on this theoretical consideration, the prior art then includes at least one further suggestion for use of a two-mass, two-spring system of this type for conveying purposes as illustrated by Fig. 9. Here an upper conveying member 84 is supported on an intermediate base member 86 by means of inclined springs 88 rather than coil springs. The intermediate base member 86 is then supported by coil springs which provide a soft or floating spring effect at 90. A rotating shaft 92 on the intermediate base 86 and an unbalanced weight 94 carried by the shaft and rotated at a frequency equal to the natural frequency of the conveyor member 84 on its springs 88 is then said to result in the desired conveying action.

In attempts to follow this prior art suggestion, however, we have found that intermediate base member 86 not only fails to remain quiescent as suggested by the theoretical analysis referred to in connection with Fig. 8, but that the movements of the intermediate base member 86 are even such as to prevent any conveying action in the conveying member 84.

We have found that this lack of satisfactory operation of the prior art suggestions can be avoided by use of the specific structural features and combinations described and claimed herein, and particularly by the use of longitudinally non-extensible or compressible spring beams of specific orientation for the support of the intermediate base member.

It is our belief that the major difficulties which, as far as we know, have prevented the actual manufacture and use of any successful commercial conveyor constructed along the prior art lines illustrated in Fig. 9 have been the failure to understand that the change from vertically movable springs as in Fig. 8 to inclined springs as in Fig. 9 introduces forces and reactions which yield unobvious torque effects, and the failure to take account of all the forces applied by a single rotating unbalanced weight. As long as the parts are vertically movable and vertically aligned as in Fig. 8, such effects do not adversely affect the vertical movement of the member 70 so as to interfere with a screening action or a packing or compacting action or something which depends upon vertical movement alone.

Introduction of the inclined springs 88 as in Fig. 9, however, yields a system which is not equivalent to that of Fig. 8 and can not be treated by the same simplified theoretical or mathematical approach. As illustrated in Fig. 9, if relative movement of the intermediate base 86 is to be substantially neutralized in a direction perpendicular to springs 88, then the force indicated by the arrow P due to the unbalanced weight 94 at a particular instant must be neutralized or offset by an equal and opposite force shown by arrow P', representing the inertial reaction of the conveyor.

While these forces are equal and opposite, they are not in alignment with each other, since they occur at opposite ends of the upper spring system and at substantially right angles thereto. Thus a rotary or torque effect is produced which can be said to have a magnitude equal to the product of P times 1, where 1 represents the perpendicular distance between the opposed forces P and P' in Fig. 9. For the particular instant illustrated in the figure, this couple produces a torque tending to rotate the two-mass system which includes conveyor 84, intermediate base 86, and springs 88. This torque will accordingly tend to depress one end of the intermediate base 86 as shown by arrow 96 and to lift the opposite end as shown by arrow 98. When the weight rotates 180 degrees farther, the direction of this couple and of the rocking tendency on base 86 will be reversed. This rocking of base 86 may actually prevent conveying of the stock by member 84, or may result in conveying in different directions at different areas of the conveying member due to the non-uniform movement of the conveying member and depending on the relative magnitude of the couple.

We have accordingly found that it is more important, if satisfactory conveying is to be achieved, to prevent vertical rocking of the intermediate base than to achieve the complete floating effect of the coil or soft springs required by the prior art. Thus the use of the spring beams as illustrated schematically in Fig. 2 of the present invention prevents rocking of the intermediate base 16, while at the same time the spring beams provide the necessary freedom of movement in a horizontal direction, i.e., in a direction having a major component perpendicular to the first set of spring beams 26 and 28. This freedom of movement, combined with application of force impulses at or near the specified natural frequency of the conveying member and first set of spring beams, makes it theoretically possible to eliminate completely (and actually possible to minimize effectively) the horizontal movement of intermediate base 16. Thus the transmission of horizontal forces to the foundation or support is reduced to an absolute minimum.

With reference to Fig. 8 again, certain prior art analyses of this type of system have also failed to take into account the problem of unwanted force impulses in directions other than those along the vertical path of movement of the work member such as screen 70. Thus in connection with Fig. 8 it is said that the intermediate base 74 remains stationary at certain frequencies for the unbalanced weight 82. In actual practice, however, any balancing of the force impulses from the rotating weight by the inertial reaction of member 70 and its spring 72 would be essentially limited to a vertical direction. Thus the horizontal components of force applied by weight 82 would not be particularly neutralized in Fig. 8 and would cause horizontal deflections of the intermediate base 74 with possible adverse effects on the desired movement of the work member 70. Thus this prior art arrangement has not provided a means for neutralizing or minimizing the undesired movements of the intermediate base in a direction substantially at right angles to the path of movement of the working member.

In the present case, where the conveying movements involve a path which is basically horizontal but necessarily includes a substantial vertical component, we have provided a preferred arrangement for the effective elimination of the undesired force impulses at right angles to the path of movement of the conveying member. One form of this preferred arrangement is illustrated in Fig. 3.

Here the conveying member 100 is connected to an intermediate base member 102 by inclined spring beams 104 similar to the first set of spring beams previously discussed. The intermediate base 102 is in turn provided with substantially vertical spring beams 106 which provide the sole supporting connection between the intermediate base and a stationary support or foundation 108.

In this case, the desired force impulses are of a reciprocating nature and are provided by balanced counterrotating weights 110 and 112 carried by shafts 114 and 116, respectively. These shafts rotate in opposite directions from the position illustrated in Fig. 3, so that all forces of the two equal and opposed weights are cancelled out at any given instant except those forces along a line perpendicular to the common plane of the two parallel shafts 114 and 116. These forces are indicated by the arrows 118. The shafts 114 and 116 are rotatably mounted on intermediate base 102 and may be driven in known manner e.g. by a separate motor and flexible shaft connection as in Fig. 1, or by a suitably oriented belt connection as in Fig. 7. The shafts are interconnected by gearing in a manner equivalent to that shown in the device of Figs. 7 and 10.

Figure 3:
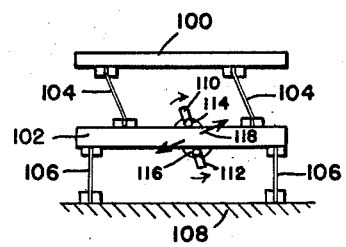
Fig. 3 is a view similar to Fig. 2 of a preferred form of vibratory conveyor according to the invention.

In Fig. 3, the parts are so oriented that the common plane of the shafts 114 and 116 is parallel to the upper set of spring beams 104 and thus the force impulses are of a reciprocating nature along a line perpendicular to the upper spring beams. Thus these forces can be neutralized by the opposed forces due to inertial reaction of the conveyor 100 on the upper end of springs 104. In this case substantially the only forces transmitted to the foundation 108 through springs 106 will be the alternating torques resulting from the couple formed by the force-applying member on the one hand and the inertial reaction of the conveyor 100 on the other, together with such secondary vertical accelerations as may be attributed to product damping due to the actual load carried on the conveying member 100.

While it is theoretically best from the standpoint of balancing out undesired forces and motions to apply the reciprocatory forces along a line perpendicular to the first set of spring beams, we have found that there are practical reasons which lead to a different arrangement in many cases. For example, the inclination of the path of the reciprocating forces along a line perpendicular to the upper inclined springs produces an arrangement in which such forces have vertical components perpendicular to the intermediate base. If this intermediate base is not sufficiently rigid, or if it is relatively long compared to its vertical thickness, these vertical components may flex the intermediate base up and down and cause undesired forces and motions.

Figure 7:
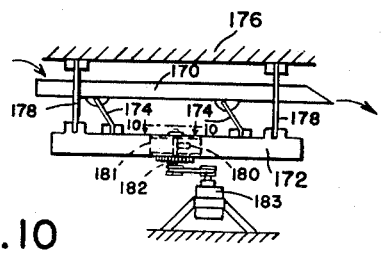
Fig. 7 shows a modified arrangement with an overhead support, and with a preferred orientation of reciprocatory force applying means.

To avoid such problems, and because it is easier to make the intermediate base longitudinally rigid than laterally inflexible, we prefer in most cases to apply the reciprocating forces along a line parallel to the intermediate base. Thus the reciprocating forces are applied in a longitudinal direction, within the range bounded by lines perpendicular to the first set of spring beams and lines parallel to the intermediate base, and preferably nearer the latter. Also, to avoid uneven gravitational effects on the counterrotating eccentric weights, we prefer in many cases to orient their axes of rotation vertically, so that the weights rotate in horizontal planes, subject to uniform gravitational effects, to produce reciprocating forces longitudinally of the conveying path and intermediate base. Such an arrangement is shown in Fig. 7 described below.

Figure 4:
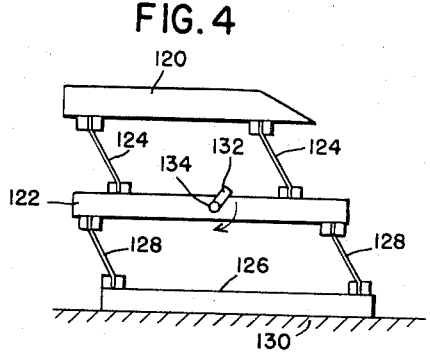
Fig. 4 is a similar schematic view of another form of the present invention.

Fig. 4 illustrates schematically a somewhat modified arrangement of the invention in which the spring beams of the lower or second set are essentially parallel to the spring beams of the upper set. Here the conveyor 120 is supported on the intermediate base 122 by upper spring beams 124 similar to those previously described. The intermediate base in turn is carried from a support 126 by lower inclined spring beams 128. The support 126 in turn engages the building foundation 130. The desired force impulses are provided by an eccentric weight 132 rotating on a transverse shaft 134 rotatably mounted in the intermediate base 122.

In this case, the inclination of the lower spring beams parallel to the upper spring beams insures that the intermediate base member 122 has freedom of movement in the same direction as the upper conveying member 120. Thus all force components and reactions perpendicular to the two sets of spring beams can theoretically be neutralized, subject to the limitations previously expressed as to frictional and product damping, among other factors. In this construction also, the reactions due to torque involving the couple formed by the rotating unbalanced weight 132 and the inertial reaction of the conveyor 120 are transmitted through the lower spring beams 128 to the support 126 in foundation 130 at reduced magnitude. The reduction in magnitude of these forces is achieved in this case by spacing the lower spring beams 128 farther apart than the upper spring beams 124 and substantially farther apart than the vertical or inclined length of the upper spring beams, i.e., farther apart than the lever arm of the above-described couple. The wider spacing between the lower spring beams 128 effectively broadens the base or arm over which the force couple is transmitted and thus reduces the actual forces transmitted at the ends of this longer arm.

Figure 5:
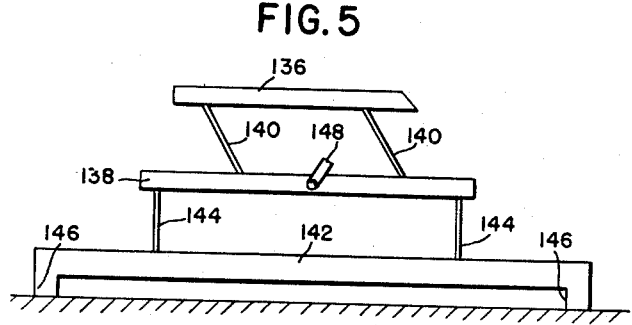
Fig. 5 is a similar schematic view of another modification designed to minimize the transmission of undesired torques to the foundation.

A somewhat similar principle for the reduction of the forces transmitted to the foundation is illustrated in Fig. 5 Here the conveying member 136 is supported on the intermediate base 138 by a first set of inclined spring beams 140. The intermediate base 138 is then mounted in turn on a lower support member 142 by means of substantially vertical spring beams 144. The spring beams 144 are more widely spaced than the spring beams 140 of the upper set and thus have the effect previously described in connection with Fig. 4. Furthermore, in the device of Fig. 5, the supporting member 142 is extended longitudinally for a substantial distance beyond the rest of the assembly and is provided with rigid feet 146 engaging the floor or foundation of the building. The relatively great distance between these feet 146 further insures the reduction in magnitude of the reactions or forces transmitted through the feet 146 to the foundation, since these forces are inversely proportional to the distance between the feet 146.

Figure 6:
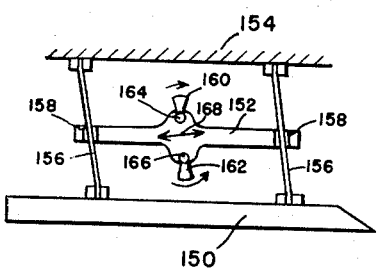
Fig. 6 is a view of a modification in which the conveyor and intermediate base are mounted from an overhead support.

As illustrated in Fig. 6, it is possible to reverse the relative vertical positions of the conveying member and intermediate base. It is also possible and in some cases desirable as shown in this figure to provide continuous spring beams extending all the way from the conveying member to the intermediate base and on to the foundation or support, so that the two sets of spring beams previously discussed are provided by opposite ends of the same springs. In Fig. 6 the conveying member is located at 150, the intermediate base at 152, and the foundation at 154. Here, the intermediate base is above the conveyor and the point of ultimate support or foundation is above the intermediate base.

Spring beams 156 are rigidly connected at their lower ends to the conveyor 150 and at their upper ends to the supporting foundation 154. At an intermediate point on these springs, which point may be vertically adjustable, the intermediate base member 152 is clamped as indicated at 158. The desired force impulses are applied to the intermediate base member by counterrotating weights 160 and 162 carried by parallel shafts 164 and 166, respectively. The relative location of these shafts is such that the resulting force impulses indicated by arrow 168 are along a line perpendicular to the inclined spring beams 156.

Thus the lower ends of these spring beams 156 serve as the so-called first set of spring beams previously discussed and provide the sole supporting connection between the conveying member and the intermediate base. At the same time, the upper ends of springs 156 serve as the second set of spring beams previously discussed and provide the sole supporting connection between the intermediate base and the foundation.

Figure 10:
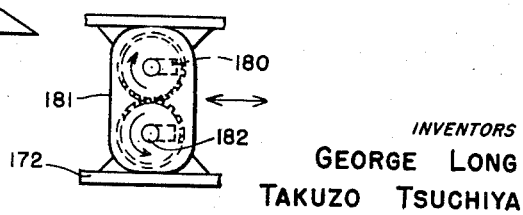
Fig. 10 is a sectional view on line 10—10 of Fig. 7.

Figs. 7 and 10 show a preferred embodiment of the invention in which the relative vertical location and arrangement of the parts are again modified. Here the conveying member 170 is relatively displaced above the intermediate base 172 and is connected thereto by inclined spring beams 174. The intermediate base 172 is in turn supported resiliently from an overhead support or foundation 176 by means of a second set of spring beams 178. Springs 178 are in this instance substantially vertical and are rigidly connected at least at one end as previously described. The use of the spring beams 178 provides the desired freedom of movement of the intermediate base in a substantially horizontal direction, while at the same time these supports prevent vertical rocking of the intermediate base as a result of the torques from the force couple previously discussed.

A pair of counterrotating eccentric weights 180, carried by shafts 182, extending transversely of the intermediate base and direction of feed, provide the desired force impulses parallel to the intermediate base and to the direction of feed. In this case shafts 182 are vertical in order that weights 182 may rotate in a horizontal plane, subject to uniform gravity effect. The shafts 182 and weights 180 are mounted in a housing 181 on frame 172 and driven by a suitable motor 183.

Example 1

As an example of one specific conveyor according to the present invention, a device of the general type shown schematically in Figure 7 was constructed as follows:

The first set of springs 174 was placed at an angle of 27 degrees with the vertical. A total of 20 such springs was employed, the springs being made of an aluminum alloy, and the total K of these springs being 2930 lbs. per inch.

For the second set of springs 178, 6 springs were used. These springs were made of ¾ inch standard pipe and had a length of 54 inches, rigidly fixed at one end and semi-rigidly connected at the other end. The total K of these springs was not in excess of 560 lbs. per inch.

The mass of the intermediate frame 172 was substantially 485 lbs. and the upper or conveying member was in the form of a tube having a mass of approximately 175 lbs.

For the force applying means two sets of oscillators were used, each having two eccentric counterrotating weights of 11.96 lbs. effective weight 2.16 inches from their axes of rotation. They were rotated at a frequency of substantially 770 r.p.m. In this particular case, the axes of the shafts were horizontal, instead of vertical (as shown in Fig. 7) and the two sets of oscillators were spaced slightly longitudinally of the intermediate base and driven by a single motor through suitable belting.

The conveyor was operated successfully to convey precooked oat cereal rings.

As an example of another specific conveyor according to the present invention, a device of the general type shown schematically in Figure 7 was constructed as follows:

The upper springs 174 were placed at an angle of 27 degrees with the vertical. A total of 8 such springs were employed, the springs being made of an aluminum alloy known commercially as 24ST aluminum and having a length of 20 inches, a width of substantially 2 inches and a maximum thickness of ⅝ inch, the total K of the springs being 1160 lbs. per inch.

For the lower set of spring beams 178, 6 springs were used. These springs were made of 1¼ inches standard pipe and had an average length of 40 inches connected at one end to a resilient mount fastened to the ceiling. The total K of these resiliently mounted spring beams was approximately 300 lbs. per inch.

The mass of the intermediate base or frame 172 was substantially 145 lbs. and the upper or conveying member was in the form of a tube having a mass of approximately 95 lbs.

For the force applying means, two eccentric counterrotating weights were used, each of 11.96 lbs. effective weight at 2.16 inches radii. These weights were rotated on transverse shafts at a frequency of substantially 670 r.p.m.

This conveyor was operated successfully to convey puffed corn cereal pellets.

According to the foregoing description, certain embodiments of the invention have been disclosed which provide for the effective vibratory conveying of materials with reduction of the forces transmitted to the foundation or other support on which the conveyor is mounted. The use of a two-mass, two-spring system in which the conveying member is carried from an intermediate base by inclined spring beams and in which cyclical or reciprocating forces are applied only to the intermediate base (at a frequency approximating the natural frequency of the system involving the conveying member and its attached spring beams) provides the basic arrangement for theoretical elimination of movement of the intermediate base and consequent reduction of force transmissions to the foundation.

In practice, however, we have found that such a system must be combined with substantially non-extensible spring beams as the means of support for the intermediate base, such beams having the direction and orientation previously discussed. Thus we have made it possible for the first time to provide effective conveying action with such a system by elimination of any rocking of the intermediate base due to transmission of torques or force couples affecting the system. Finally, the elimination of undesired force components in directions parallel to the inclined spring beams which carry the conveying member, by use of some force-applying means which provides reciprocating forces solely in a longitudinal direction within the specified range between lines perpendicular to the upper set of spring beams and lines parallel to the intermediate base, makes it possible to reduce further the transmission of forces to the support or foundation and at the same time maintain a high degree of conveying efficiency.

Since minor variations and changes in the exact details of construction will be apparent to persons skilled in this field, it is intended that this invention shall cover all such changes and modifications as fall within the spirit and scope of the attached claims.

We claim:

1. A vibratory conveyor comprising a conveying member extending along a predetermined direction of feed, an intermediate base member displaced therefrom and extending along a similar direction, a first set of spring beams similarly inclined with respect to the direction of feed on the conveying member and having their opposite ends connected to said conveying member and base member at points spaced longitudinally along the direction of feed thereon respectively, said first spring beams each being slightly inclined to a plane perpendicular to the direction of feed at the point of attachment of that spring beam to the conveying member, said first spring beams providing the sole load-supporting connection for said conveying member and permitting back and forth movement along an inclined path perpendicular to said beams, a second set of beams extending from said base member at points spaced longitudinally along the direction of feed thereon, said second beams each extending in a direction within the range of 45° from a vertical line and also within 45° of a line extending in the direction of inclination of said first spring beams, said second beams being connected for resilient movement of the intermediate base along a line perpendicular to said second beams and providing the sole connection between said base member and a suitable support, and means applying a cyclical force solely to said base member at a frequency relatively close to the natural frequency of the system consisting of the conveying member and first set of spring beams, said cyclical force including major to and fro components along said path.

2. A vibratory conveyor according to claim 1 in which said force applying means has a construction and orientation applying to the base member a reciprocating force which alternates rapidly in opposite directions along a line which is perpendicular to the spring beams of one of said sets at the point of application of said force.

3. A vibratory conveyor according to claim 1 in which said force applying means includes a pair of counter-rotating eccentric weights having their rotational axes extending horizontally and transversely of said path and base, said weights thereby providing a resultant force which reciprocates parallel to said path and substantially perpendicular to said first spring beams.

4. A vibratory conveyor comprising a generally horizontal, longitudinally extending conveying member, an intermediate base member substantially parallel thereto and vertically displaced therefrom, a first set of parallel spring beams slightly inclined to the vertical and having their opposite ends rigidly connected to said conveying member and base member at longitudinally spaced points thereon respectively, said first spring beams providing the sole load supporting connection for said conveying member and permitting back and forth movement along an inclined path perpendicular to said beams, a second set of parallel spring beams extending from said base member at longitudinally spaced points thereon in a direction within the range limited on the one hand by lines parallel to said first spring beams and on the other hand by substantially vertical lines, said second spring beams providing the sole connecting means between said base member and a suitable stationary support, and means applying a cylical force solely to said base member at a frequency relatively close to the natural frequency of the system consisting of the conveying member and first set of spring beams, said cyclical force including major to and fro components along said path.

5. A vibratory conveyor comprising a conveying member extending longitudinally along a desired direction of feed, a base member parallel thereto, a first set of spring beams parallel to each other and connecting the conveying member and base member at longitudinally spaced points thereon respectively, the individual spring beams normally lying in planes which intersect at an acute angle a plane normal to the direction of feed, the lines of intersection of such planes being generally horizontal and said spring beams thereby providing for relative back and forth movement of the conveying member along a path perpendicular to the spring beams and vertically inclined with respect to the direction of feed, a second set of spring beams parallel to each other and extending generally perpendicularly from said base member at longitudinally spaced points thereon and constituting the sole connection between said base and a suitable rigid support, and means for applying to said base member a reciprocating force which alternates rapidly in opposite directions along a line parallel to said path at a frequency sub-substantially equal to the natural frequency of the system consisting of said first set of spring beams and said conveying member.

6. A vibratory conveyor according to claim 5 in which said conveying member is above said base member and the spring beams of said second set extend downwardly from said base member.

7. A vibratory conveyor according to claim 5 in which said conveying member is above said base member and the spring beams of said second set extend upwardly from said base member.

8. A vibratory conveyor according to claim 5 in which the spring beams of said second set are parallel to the spring beams of the first set.

References Cited in the file of this patent

UNITED STATES PATENTS

| | | |
|---|---|---|
| 2,353,492 | O'Connor | July 11, 1944 |

FOREIGN PATENTS

| | | |
|---|---|---|
| 584,435 | Germany | Sept. 20, 1933 |
| 828,944 | Germany | Jan. 21, 1952 |